Aug. 8, 1939.    A. W. NORDGREN    2,168,680
CONTROL SYSTEM FOR HEATING PLANTS
Filed Jan. 2, 1936
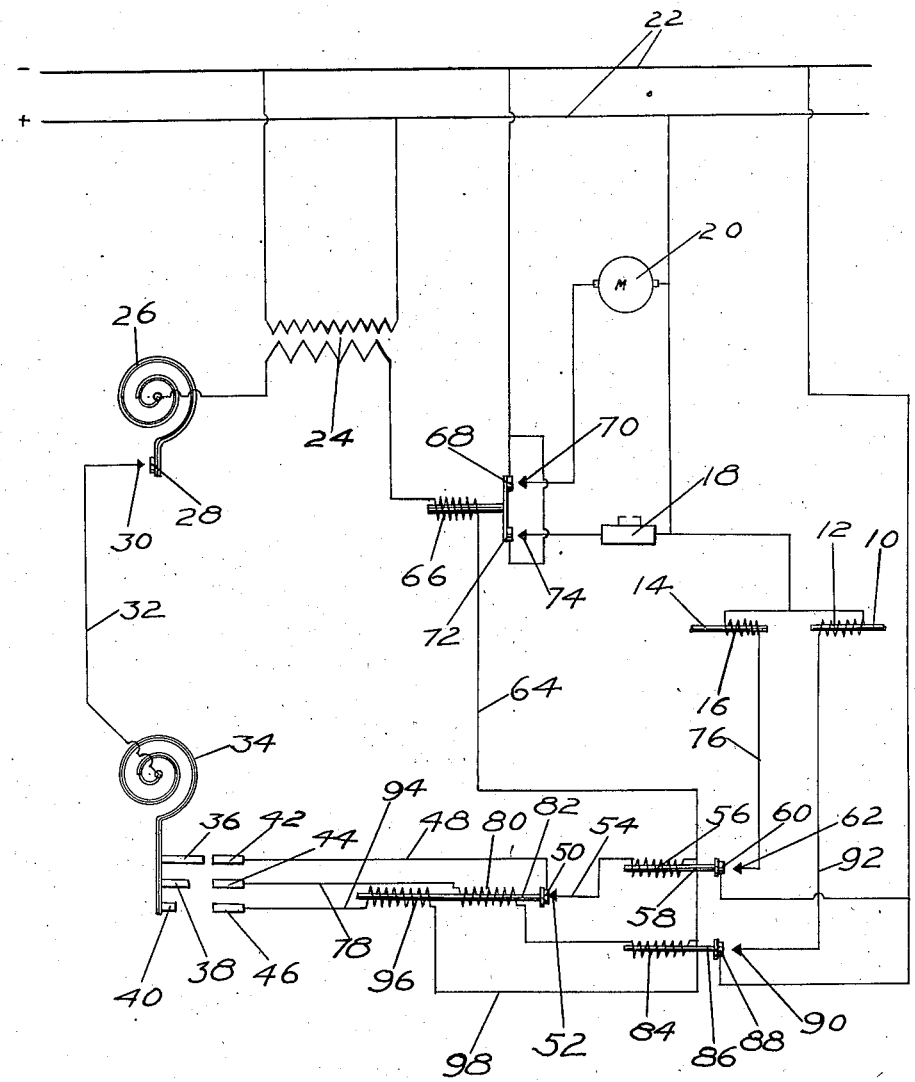
INVENTOR.
ARNOLD W. NORDGREN
BY McConkey & Booth
ATTORNEYS.

Patented Aug. 8, 1939

2,168,680

UNITED STATES PATENT OFFICE 2,168,680

CONTROL SYSTEM FOR HEATING PLANTS

Arnold W. Nordgren, South Bend, Ind., assignor to International Engineering Corporation, Chicago, Ill., a corporation of Illinois Application January 2, 1936, Serial No. 57,087

4 Claims. (Cl. 236—91)

This invention relates to the control of heating systems, especially those for dwellings, and is adapted for use with all heating systems controlled by a thermostat in the space being heated, whether using oil or gas or other fuel.

An object of the invention is to arrange the system so that in mild weather a small heating unit, turned on and off at frequent intervals, is used instead of the usual large heating unit turned on and off at infrequent intervals. This prevents the stratification of the air in the room being heated (and consequent undesirably low temperature near the floor) which sometimes takes place when the heating plant is turned on and off at very long intervals. At the same time my novel arrangement provides ample capacity in the heating plant for severe weather.

In one desirable arrangement a thermostat controlled by the temperature outdoors places selectively under the control of the room thermostat a plurality of burners at the heating plant, preferably a large burner and a small burner. Thus in mild weather only the small burner may be used, in ordinary cold weather only the large may be used, while in severely cold weather both burners may be used.

Various features of novelty relate to the arrangement of a novel circuit, and control devices turned on and off thereby, and especially the correlation therewith of ignition means and the motor for the blower supplying air to the heating plant (if forced draft is used), and these and other features and objects of the invention will be apparent from the following description of the illustrative embodiment shown in the accompanying drawing in which:

The figure is a diagram of my novel control system, including an electric circuit for rendering it effective.

In this diagram, the heating plant, and the large and small burners thereof, are not shown, as they may be of any desired construction and may use any desired fuel. The control for the valve or other fuel-controlling device of the large burner is indicated as the core 10 of a solenoid indicated at 12, while the control of the valve or other fuel-controlling device of the small burner is indicated as the core 14 of a second solenoid 16. The ignition means of the heating plant is indicated diagrammatically as a spark plug 18, and the motor for the blower supplying air to the heating plant is indicated at 20.

All of these parts may be of any desired construction, and it is intended that the parts illustrated, as above mentioned, diagrammatically shall be considered as typical of their usual equivalents.

The electric power lines are indicated at 22, arranged to supply to the control circuit described below low-voltage current through a transformer 24. One side of the transformer secondary is shown connected to a thermostat 26, illustrated as of the bimetallic blade type, arranged in the room or space being heated by the heating plant whose burners are controlled by the plungers 10 and 14.

The thermostat 26 is arranged to open and close, as the room temperature rises above and drops below a predetermined temperature (e. g., 72° F.), contacts 28 and 30, thus opening and closing a circuit 32 leading and connected to a second thermostat 34 arranged outdoors, or at least subject to the outdoor temperature.

The thermostat 34 carries three contacts 36, 38, and 40, of different lengths which, as the outdoor temperature drops, successively engage fixed contacts 42, 44, and 46.

The closing of the contacts 36 and 42 (in mild weather) closes a shunt circuit through a line 48, through contacts 50 and 52, a line 54, a solenoid 56 whose core 58 is thereby shifted to the right to close contacts 60 and 62, thence by a line 64, and through a solenoid 66 whose core is thereby shifted to the right to close contacts 68 and 70 and contacts 72 and 74, and finally back to the other side of the secondary of the transformer 24.

The closing of the contacts 60 and 62 closes a circuit 76 from the power lines 22 through the solenoid 16, thereby turning on the small burner. At the same time the closing of contacts 68 and 70 turns on the blower by energizing the motor 20, while the closing of the contacts 72 and 74 energizes the ignition means 18.

Thus, when contacts 36 and 42 are closed (and contacts 38 and 44 still open), the closing and opening of the contacts 28 and 30 turns the small burner on and off and at the same time turns on and off the blower and the ignition means.

When contacts 38 and 44 close, that is in ordinary cold weather, a second shunt circuit is closed through a line 78, through a solenoid 80 whose core 82 shifts to the left to open the contacts 50 and 52 to render the small burner ineffective, thence through a solenoid 84 whose core 86 shifts to the right to close contacts 88 and 90 to energize a circuit 92 from the power line 22 through the solenoid 12 to turn the large burner on, and then through the line 64 and solenoid 66 back to the transformer 24 as before.

Thus the closing of the contacts 38 and 46 renders the small burner inoperative and places the large burner under the control of the room thermostat 26.

The closing of the contacts 40 and 46, in severe weather, closes a third shunt circuit through a line 94, through a solenoid 96 arranged to act on the core 82 in the opposite direction to the solenoid 80 and thereby balancing the effect on the core and closing the contacts 50 and 52 again, and then through a lead 98 to the lead 64 and through the solenoid 66 back to the transformer 24. This, it will be observed, puts both of the burners under the control of the room thermostat 26.

It will be noted that when either or both of the burners is under the control of the room thermostat, the blower motor 20 and the ignition means 18 are also similarly controlled.

While one illustrative arrangement has been described in detail, it is not my intention to limit the scope of the invention to that particular arrangement, or otherwise than by the terms of the appended claims.

I claim:

1. A control system for a heating plant including a large and a small burner having control devices, said system comprising a circuit comprising contacts actuated by room temperature to open and close the circuit and an outdoor thermostat having three sets of contacts closed successively as the outdoor temperature drops and which control three shunt portions of said circuit, means actuated by the closing of the first shunt portion of the circuit for placing the control device of the small burner in a position to be turned on and off by the closing and opening of the room temperature controlled contacts, means actuated by the closing of the first and second shunt portions of the circuit for rendering the control device of the small burner ineffective and for placing the control device of the large burner in a position to be turned on and off by the closing and opening of the room temperature controlled contacts, and means actuated by the closing of all three shunt portions of the circuit for placing the control devices of both burners in positions to be turned on and off by the closing and opening of the room temperature controlled contacts.

2. A control system for a heating plant including a large and a small burner having control devices, said system comprising a circuit comprising contacts actuated by room temperature to open and close the circuit and an outdoor thermostat having three sets of contacts closed successively as the outdoor temperature drops and which control three shunt portions of said circuit, means actuated by the closing of the first shunt portion of the circuit for placing the control device of the small burner in a position to be turned on and off by the closing and opening of the room temperature controlled contacts, means actuated by the closing of the first and second shunt portions of the circuit for rendering the control device of the small burner ineffective and for placing the control device of the large burner in a position to be turned on and off by the closing and opening of the room temperature controlled contacts, and means actuated by the closing of all three shunt portions of the circuit for placing the control devices of both burners in positions to be turned on and off by the closing and opening of the room temperature controlled contacts, and ignition means and a blower operating motor controlled by the opening and closing of the room temperature-controlled contacts when any one or more of said shunt portions of the circuit is closed.

3. A control system for a heating plant including a large and a small burner having control devices, said system comprising a circuit comprising contacts actuated by room temperature to open and close the circuit and an outdoor thermostat having three sets of contacts closed successively as the outdoor temperature drops and which control three shunt portions of said circuit, means actuated by the closing of the first shunt portion of the circuit for placing the control device of the small burner in a position to be turned on and off by the closing and opening of the room temperature controlled contacts, means actuated by the closing of the first and second shunt portions of the circuit for rendering the control device of the small burner ineffective and for placing the control device of the large burner in a position to be turned on and off by the closing and opening of the room temperature controlled contacts, and means actuated by the closing of all three shunt portions of the circuit for placing the control devices of both burners in positions to be turned on and off by the closing and opening of the room temperature controlled contacts, and ignition means controlled by the opening and closing of the room temperature-controlled contacts when any one or more of said shunt portions of the circuit is closed.

4. A control system for a heating plant including a large and a small burner having control devices, said system comprising a circuit comprising contacts actuated by room temperature to open and close the circuit and an outdoor thermostat having three sets of contacts closed successively as the outdoor temperature drops and which control three shunt portions of said circuit, means actuated by the closing of the first shunt portion of the circuit for placing the control device of the small burner in a position to be turned on and off by the closing and opening of the room temperature controlled contacts, means actuated by the closing of the first and second shunt portions of the circuit for rendering the control device of the small burner ineffective and for placing the control device of the large burner in a position to be turned on and off by the closing and opening of the room temperature controlled contacts, and means actuated by the closing of all three shunt portions of the circuit for placing the control devices of both burners in positions to be turned on and off by the closing and opening of the room temperature controlled contacts, and a blower operating motor controlled by the opening and closing of the room temperature-controlled contacts when any one or more of said shunt portions of the circuit is closed.

ARNOLD W. NORDGREN.